(12) United States Patent
Reppenhagen et al.

(10) Patent No.: US 11,560,096 B2
(45) Date of Patent: Jan. 24, 2023

(54) VEHICLE STORAGE ASSEMBLY

(71) Applicant: Ford Global Technologies, LLC, Dearborn, MI (US)

(72) Inventors: Nancy Reppenhagen, Livonia, MI (US); Sushant Sunil Ghase, Plymouth, MI (US); Vincent John Buttimer, Ferndale, MI (US); John Rudolph, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 30 days.

(21) Appl. No.: 17/232,190

(22) Filed: Apr. 16, 2021

(65) Prior Publication Data

US 2022/0332255 A1 Oct. 20, 2022

(51) Int. Cl.
*B60R 5/04* (2006.01)

(52) U.S. Cl.
CPC ...................... *B60R 5/04* (2013.01)

(58) Field of Classification Search
CPC .................... B60R 5/04; B60P 7/06
USPC .......................................... 296/37.1
See application file for complete search history.

(56) References Cited

U.S. PATENT DOCUMENTS

| | | | | |
|---|---|---|---|---|
| 5,121,958 A * | 6/1992 | Goeden | ................... | B60R 7/005 296/37.16 |
| 5,772,370 A * | 6/1998 | Moore | ................... | B60R 7/005 410/97 |
| 5,772,371 A * | 6/1998 | Ackerman | ............ | F16G 11/046 410/97 |
| 6,131,983 A * | 10/2000 | Jackson | ................. | B60R 13/01 296/39.1 |
| 6,217,268 B1 * | 4/2001 | Chou | ...................... | B60R 7/005 410/97 |
| 6,695,556 B2 | 2/2004 | Addy | | |
| 6,793,449 B1 | 9/2004 | Simpson et al. | | |
| 7,708,327 B2 * | 5/2010 | Lim | ......................... | B60R 7/02 410/97 |
| 7,841,815 B1 * | 11/2010 | Lane | ..................... | B60P 7/0807 410/97 |
| 8,215,693 B2 * | 7/2012 | Ulita | ........................ | B60R 7/02 296/37.16 |

(Continued)

FOREIGN PATENT DOCUMENTS

CN            112406684 A * 2/2021 ............ B60P 7/0807

*Primary Examiner* — Pinel E Romain
(74) *Attorney, Agent, or Firm* — Vichit Chea; Price Heneveld LLP

(57) ABSTRACT

A storage assembly for a vehicle includes a first harness assembly configured to selectively engage said vehicle. The first harness assembly includes a first inner support strap and a second inner support strap coupled to the first inner support strap in a crossing configuration. An inner connector strap is coupled to at least one of the first inner support strap and the second inner support strap. A second harness assembly is configured to selectively engage said vehicle. The second harness assembly includes a first outer support strap and a second outer support strap coupled to the first outer support strap in a crossing configuration. An outer connector strap is coupled to at least one of the first outer support strap and the second outer support strap. The outer connector strap of the first harness assembly selectively couples with the inner connector strap of the second harness assembly.

20 Claims, 14 Drawing Sheets

(56) References Cited

U.S. PATENT DOCUMENTS

| | | |
|---|---|---|
| 8,740,525 B2 | 6/2014 | Coury et al. |
| 10,793,105 B1 | 10/2020 | Baumbick et al. |
| 2008/0206010 A1* | 8/2008 | Fa-Kouri ............... B60P 3/122 |
| | | 242/370 |
| 2009/0096238 A1 | 4/2009 | Misch |
| 2010/0270821 A1* | 10/2010 | Ulita ....................... B60R 5/04 |
| | | 296/37.16 |
| 2018/0326897 A1 | 11/2018 | Salter et al. |
| 2018/0334078 A1 | 11/2018 | Wang et al. |
| 2019/0217784 A1 | 7/2019 | Vanderpool et al. |

* cited by examiner

VEHICLE STORAGE ASSEMBLY

FIELD OF THE DISCLOSURE

The present disclosure generally relates to a storage assembly. More specifically, the present disclosure relates to storage assembly for a vehicle cargo space.

BACKGROUND OF THE DISCLOSURE

Vehicles may have space within an interior utilized for storing items. One space that may be used for storage is a cargo area of the vehicle.

SUMMARY OF THE DISCLOSURE

According to at least one aspect of the present disclosure, a vehicle storage assembly includes a base. A first support frame has a first end and a second end. The first end of the first support frame is disposed proximate to a first side edge of the base. A second support frame has a first end and a second end. The first end of the second support frame is disposed proximate to a second side edge of the base. The first side edge opposes the second side edge. A harness assembly is coupled to the base, the first support frame, and the second support frame. The harness assembly includes an inner harness coupled to an inner side of the base. The inner harness includes a first inner strap that extends from the second side edge to the first support frame and a second inner strap that extends from the first side edge to the second support frame. An outer harness is coupled to an outer side of the base. The outer harness includes a first outer strap that extends from the second side edge to the first support frame and a second outer strap that extends from the first side edge to the second support frame.

According to another aspect of the present disclosure, a storage assembly for a vehicle cargo space includes a base. A first support frame has a first end and a second end. The first end of the first support frame is disposed proximate to a first side edge of the base. A second support frame has a first end and a second end. The first end of the second support frame is disposed proximate to a second side edge of the base. The first side edge opposes the second side edge. A harness assembly is coupled to the base, the first support frame, and a second support frame. The harness assembly includes an inner harness coupled to an inner side of the base. The inner harness includes at least one inner support strap and at least one inner connector strap. An outer harness is coupled to an outer side of the base. The outer harness includes at least one outer support strap and at least one outer connector strap. The at least one inner connector strap selectively couples with the at least one outer connector strap.

According to another aspect of the present disclosure, a storage assembly for a vehicle includes a first harness assembly configured to selectively engage said vehicle. The first harness assembly includes a first inner support strap and a second inner support strap coupled to the first inner support strap. The first inner support strap and the second inner support strap are arranged in a crossing configuration. An inner connector strap is coupled to at least one of the first inner support strap and the second inner support strap. A second harness assembly is configured to selectively engage said vehicle. The second harness assembly includes a first outer support strap and a second outer support strap coupled to the first outer support strap. The first outer support strap and the second outer support strap are arranged in a crossing configuration. An outer connector strap is coupled to at least one of the first outer support strap and the second outer support strap. The outer connector strap of the first harness assembly selectively couples with the inner connector strap of the second harness assembly.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
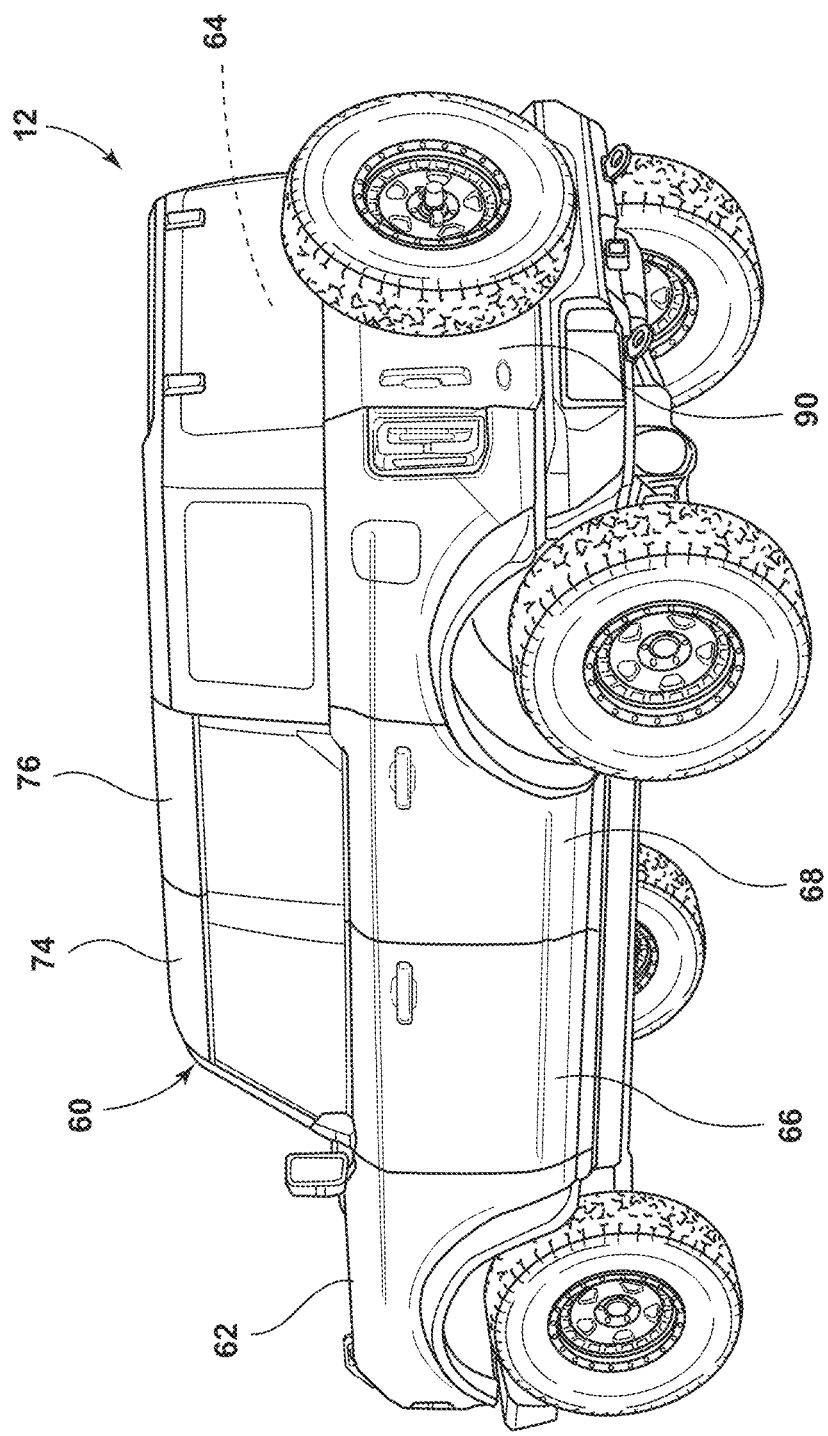
FIG. 1 is a rear perspective view of a vehicle with door panels and roof panels coupled to a vehicle body, according to the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-16, reference numeral 10 generally designates a storage assembly for vehicle 12 that includes a base 14. A first support frame 16 has a first end 18 and a second end 20, where the first end 18 is disposed proximate to a first side edge 22 of the base 14. A second support frame 24 has a first end 26 and the second end 28, where the first end 26 is disposed proximate to a second side edge 30 of the base 14. The first side edge 22 opposes the second side edge 30. A harness assembly 32 is coupled to the base of 14, the first support frame 16, and the second support frame 24. The harness assembly 32 includes an inner harness 34 coupled to an inner side 36 of the base 14. The inner harness 34 includes a first inner support strap 38 that extends from the second side edge 30 to the first support frame 16 and a second inner support strap 40 that extends from the first side edge 22 to the second support frame 24. The harness assembly 32 also includes an outer harness 42 coupled to an outer side 44 of the base 14. The outer harness 42 includes a first outer support strap 46 that extends from the second side edge 30 to the first support frame 16 and the second outer support strap 48 that extends from the first side edge 22 to the second support from 24.

Figure 2:
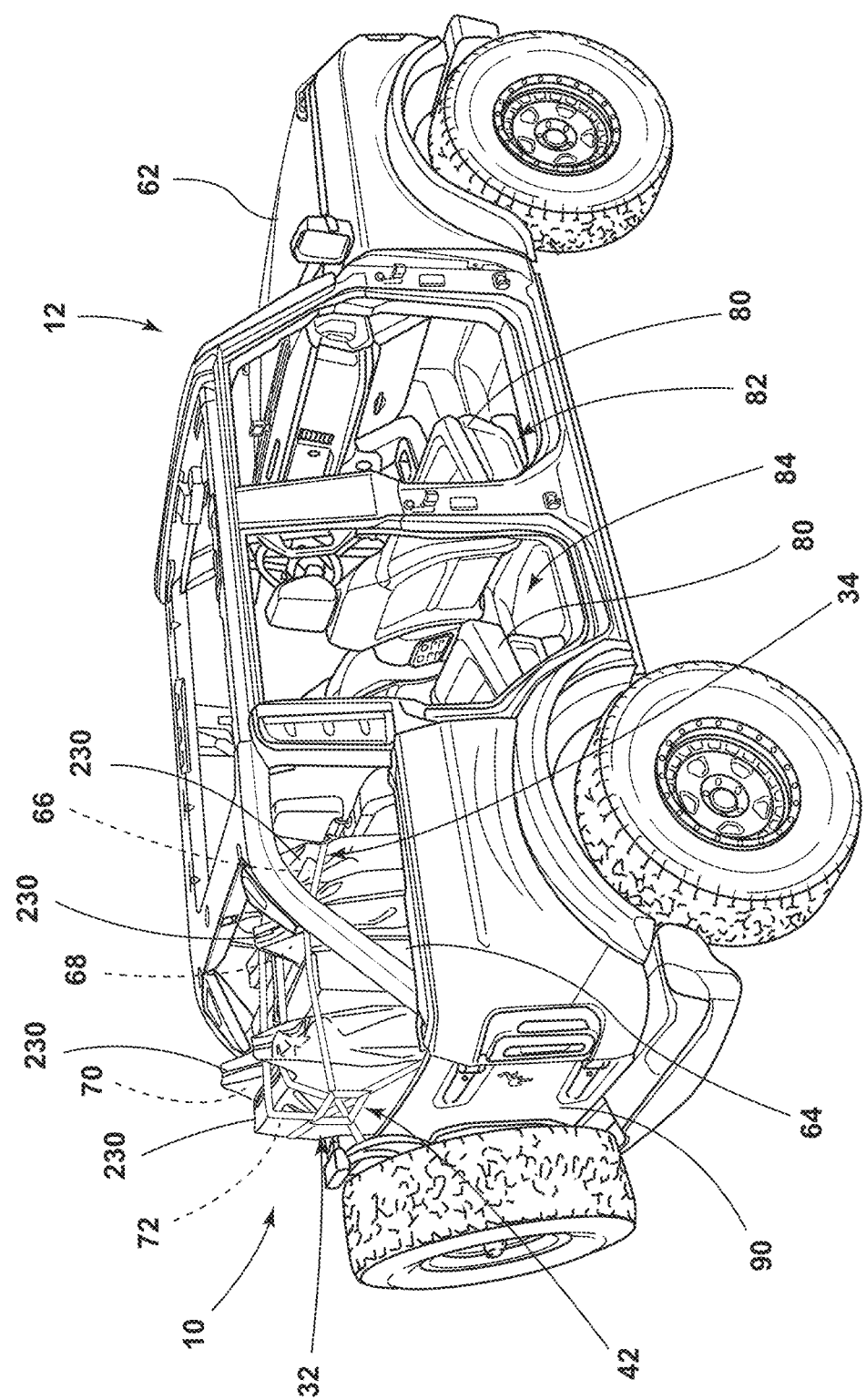
FIG. 2 is a partial rear perspective view of a vehicle with door panels and roof panels removed from a vehicle body and the door panels stored in a cargo space of the vehicle, according to the present disclosure.

Referring to FIGS. 1 and 2, the vehicle 12 includes multiple panels 60 that are selectively coupled to a vehicle body 62. The panels 60 may be removed from the vehicle body 62 and stored within a cargo space 64 of the vehicle 12. The panels 60 generally include a front driver door 66, a rear driver door 68, a front passenger door 70, and a rear passenger door 72. Additionally, the panels 60 generally include roof panels 74, 76. Additional or fewer door panels 60 and roof panels 60 may be included on the vehicle 12 without departing from the teachings herein. A user may determine which panels 60 to remove from the vehicle body 62 for each use and store the separated panels 60 within the cargo space 64 utilizing the storage assembly 10 described herein. While the vehicle 12 is illustrated as a four-door configuration, it is contemplated that the vehicle 12 may be a two-door configuration without departing from the teaching herein.

In the illustrated example, the vehicle 12 includes multiple seating assemblies 80 arranged in a first seating row 82 and a second seating row 84. The second seating row 84 is disposed rearwardly of the first seating row 82. As illustrated, the cargo space 64 is disposed rearwardly of the second seating row 84 and between the first and second support frames 16, 24. Generally, the first and second support frames 16, 24 are D-pillars of the vehicle 12 but may have other configurations without departing from the teachings herein.

The cargo space 64 may be accessed via a rear door 90. The rear door 90 may be any configuration of a tailgate, a liftgate, a trunk, or any other type of rear door 90. The cargo space 64 may be utilized by the user to store one or more of the various panels 60.

Referring still to FIGS. 1 and 2, the vehicle 12 may be a sport utility vehicle, a sedan, a truck, a van, a crossover, other wheeled motor vehicles 12, or other styles or types of vehicles 12. The vehicle 12 may be a manually operated vehicle 12 (e.g., operated with a human driver), a partially autonomous vehicle 12 (e.g., operated with or without a human driver), or a fully autonomous vehicle 12 (e.g., operated without a human driver). Additionally, the vehicle 12 may be utilized for personal or commercial purposes, such as transporting, ride-providing services (e.g., chauffeuring), or ridesharing services.

Figure 3:
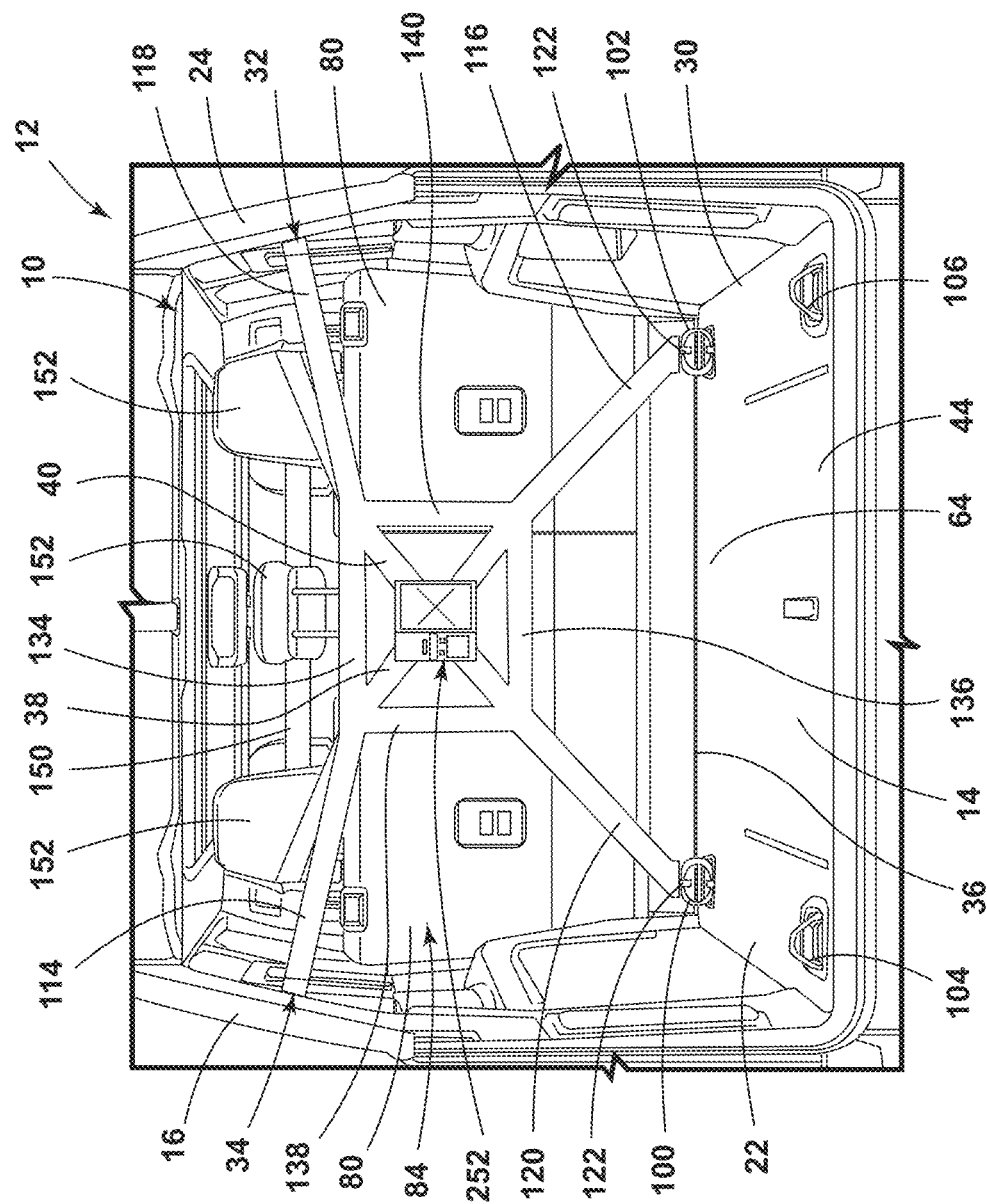
FIG. 3 is a rear elevational view of a cargo space of a vehicle with an inner harness, according to the present disclosure.

Referring to FIG. 3, the vehicle 12 includes a base 14 disposed within the cargo space 64 of the vehicle 12. The base of 14 may be a floor or other support structure that may be fixedly or removably coupled to the vehicle body 62. The first support frame 16 is disposed proximate to the first side edge 22 (e.g., illustrated as a left side edge) of the base 14, and the second support frame 24 is disposed proximate to the second side edge 30 (e.g., illustrated as a right side edge). The first and second support frames 16, 24 extend parallel to one another. Generally, the first ends 18, 26 of the first and second support frames 16, 24, respectively, are disposed proximate to the outer side 44 of the base 14. The first and second support frames 16, 24 extend vertically and toward the second seating row 84.

Generally, the harness assembly 32 is selectively coupled to the base 14 and the first and second support frames 16, 24. The base 14 includes base fasteners 100, 102 coupled to the inner side 36 of the base 14, and base fasteners 104, 106 coupled to the outer side 44 of the base 14. The inner side 36 of the base 14 is disposed proximate to the second seating row 84 and the outer side 44 is disposed proximate to the rear door 90. The base fasteners 100, 102, 104, 106 are generally configured as D-rings.

Each of the first and second support frames 16, 24 includes a frame fastener 110, 112, respectively, for selectively engaging the harness assembly 32. Each frame fastener 110, 112 may include a threaded eyebolt, which engages a clinch nut. The clinch nuts may be fixedly coupled to the respective first and second support frame 16, 24.

Figure 4:
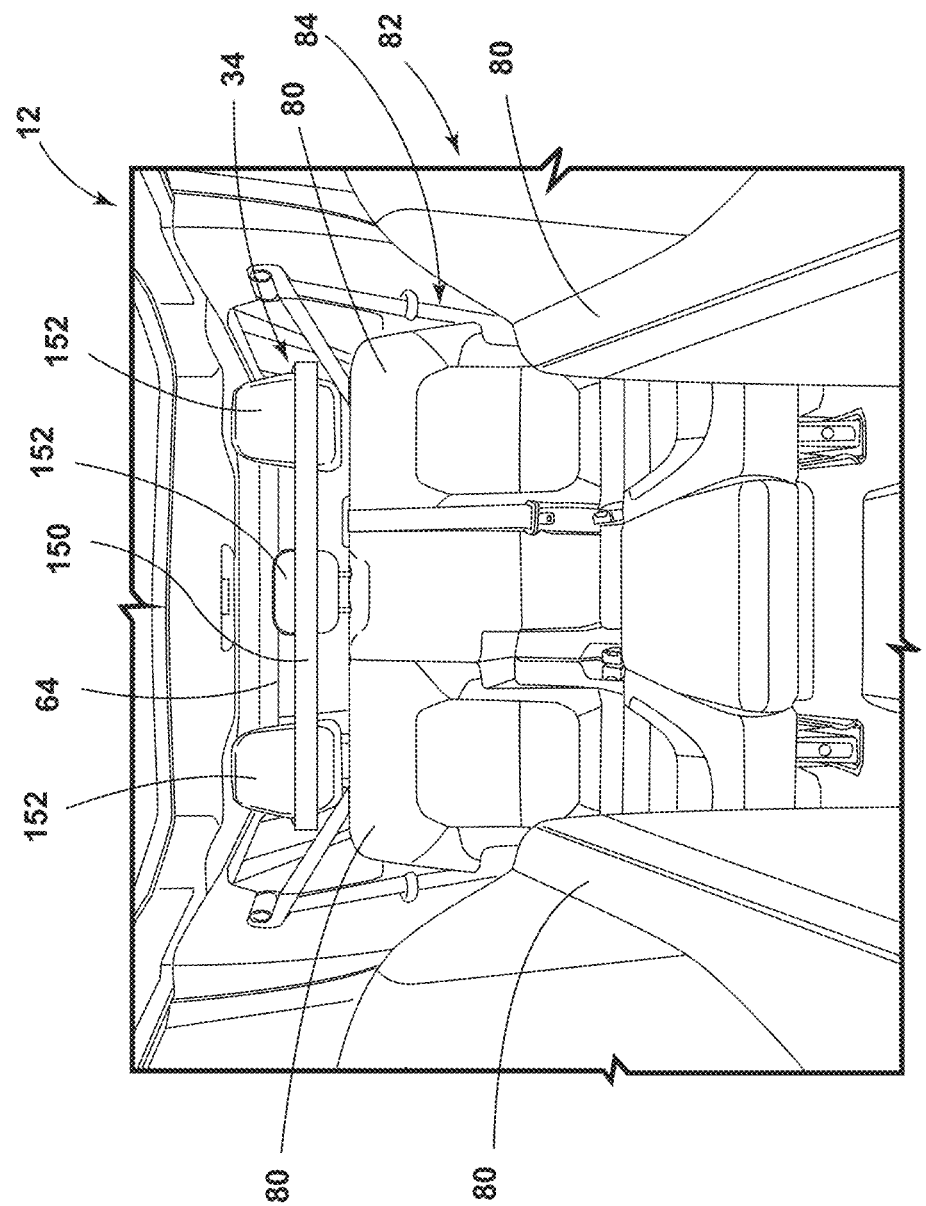
FIG. 4 is a partial front perspective view of a rear seating row with a stabilizing strap of an inner harness looped around seating assemblies, according to the present disclosure.
Figure 5:
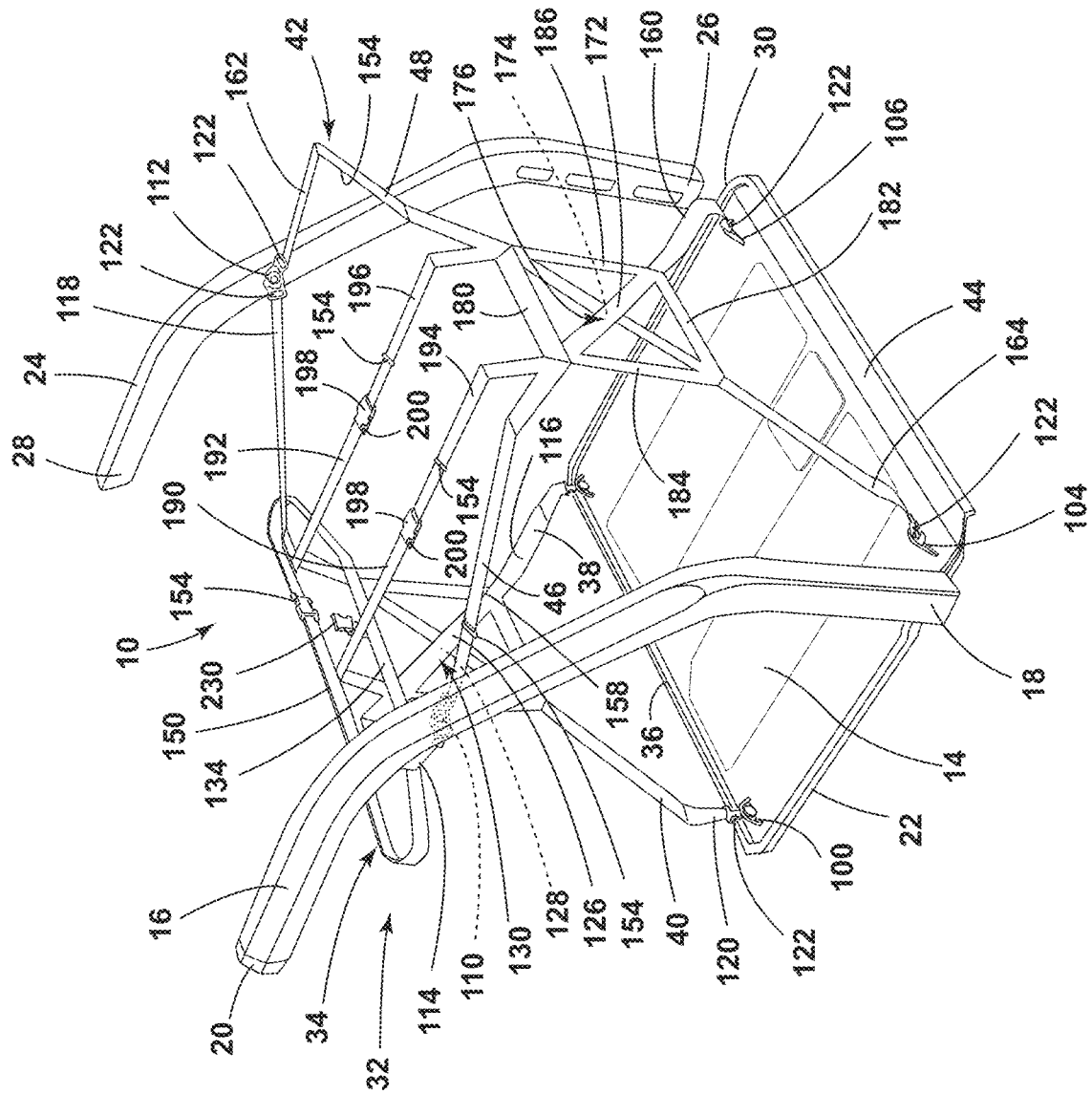
FIG. 5 is a side perspective view of a storage assembly for a vehicle cargo space, according to the present disclosure.

Referring still to FIG. 3 as well as FIGS. 4 and 5, the inner harness 34 of the harness assembly 32 is disposed proximate to the second seating row 84. The inner harness 34 is coupled to the base fasteners 100, 102 on the inner side 36 of the base 14. The inner harness 34 is also selectively coupled to the frame fasteners 110, 112 of the first and second support frames 16, 24. Accordingly, the inner harness 34 is coupled to two base fasteners 100, 102 and two frame fasteners 110, 112. The inner harness 34 is also selectively coupled to the seating assemblies 80 within the second seating row 84 as described further herein.

The inner harness 34 includes the first inner support strap 38 and the second inner support strap 40 arranged in a crossing or "X" configuration. Each end 114, 116 of the first inner support strap 38 and each end 118, 120 of the second inner support strap 40 includes a coupling feature 122, such as a hook or clasp, for selectively engaging the base fasteners 100, 102 and the frame fasteners 110, 112, respectively. The first inner support strap 38 extends from the base fastener 102 proximate to the second side edge 30 of the base 14 to the frame fastener 110 of the first support frame 16. The second inner support strap 40 extends from the base fastener 102 on the first side edge 22 of the base 14 to the frame fastener 112 on the second support frame 24.

A center portion 126 of the first inner support strap 38 is coupled to a center portion 128 of the second inner support strap 40 at an attachment point 130. The center portions 126, 128 are generally stitched or otherwise coupled together. The X-configuration of the inner harness 34 provides a webbing support for cargo within the cargo space 64.

Referring to FIGS. 3-5, the inner harness 34 includes multiple reinforcing straps 134, 136, 138, 140 coupled to the first inner support strap 38 and the second inner support strap 40. Generally, the reinforcing strap 134 is arranged parallel to the reinforcing strap 136, with each reinforcing strap 134, 136 extending horizontally between the first and second inner support straps 38, 40. The reinforcing strap 134 extends above the attachment point 130 and the reinforcing strap 136 extends below the attachment point 130. The reinforcing strap 138 is generally parallel to the reinforcing strap 140, which each extends vertically between the first and second inner support straps 38, 40. The reinforcing strap 138 is arranged on a first side of the attachment point 130 (e.g., a left side) and the reinforcing strap 140 is arranged on a second opposing side (e.g., a right side) of the attachment point 130. In the illustrated configuration, the reinforcing straps 134, 136, 138, 140 generally form a square or other quadrilateral around the attachment point 130 to increase the strength of the inner harness 34.

The inner harness generally includes a stabilizing strap 150 selectively coupled to the seating assemblies 80 of the second seating row 84. The stabilizing strap 150 is a loop that extends around headrests 152 of the seating assemblies 80 in the second seating row 84. The stabilizing strap 150 extends between the first inner support strap 38 proximate to the reinforcing strap 134 to the second inner support strap 40 proximate to the reinforcing strap 134. Alternatively, the stabilizing strap 150 may extend from the reinforcing strap 134. Generally, the stabilizing strap 150 includes a tension adjuster 154 to secure the stabilizing strap 150 on the headrests 152. The stabilizing strap 150 assists in retaining cargo within an upright position, abutting the seating assemblies 80 as described further herein.

Figure 6:
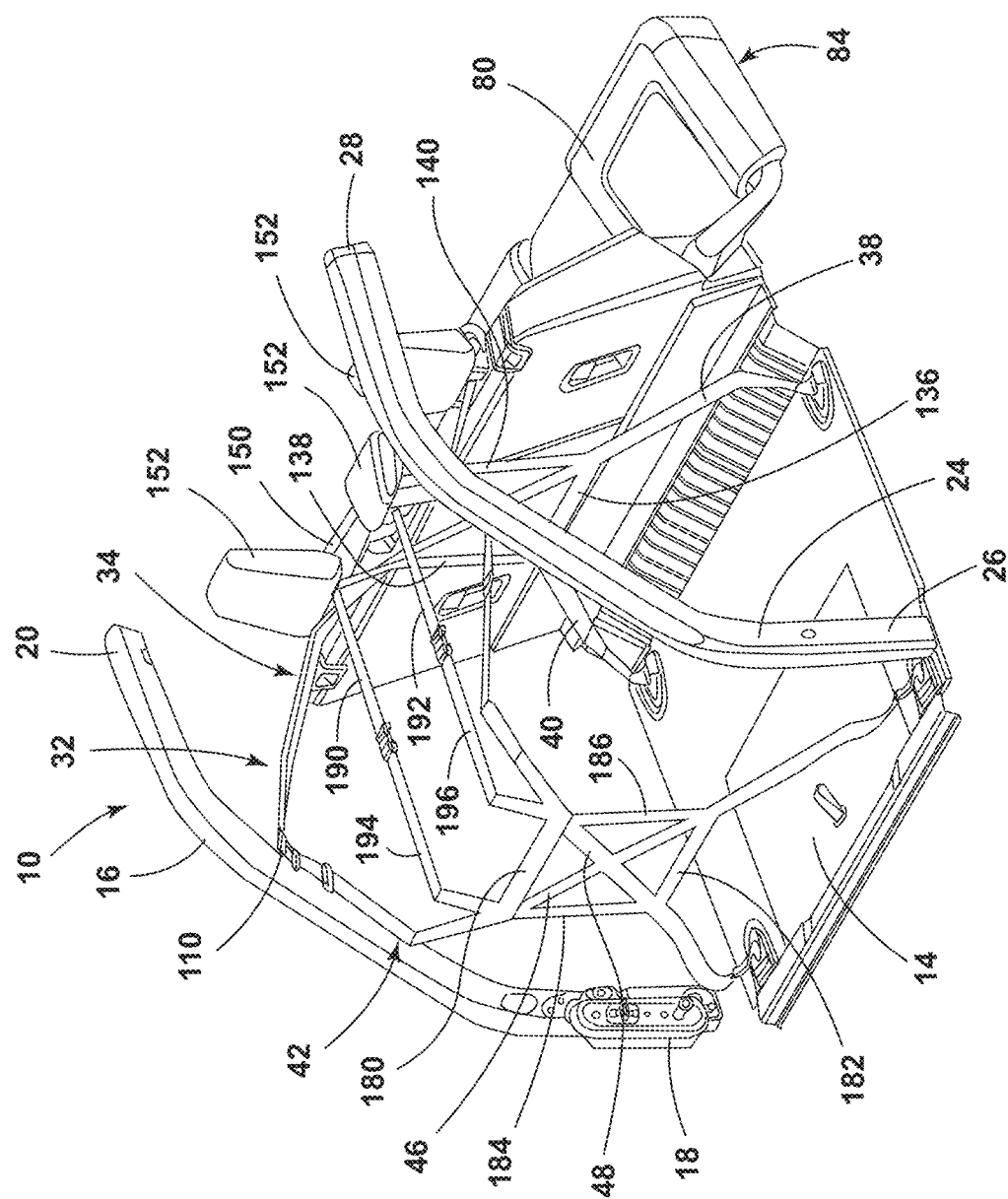
FIG. 6 is a side perspective view of a storage assembly for a vehicle cargo space engaging a rear seating row, according to the present disclosure.

Referring still to FIG. 5, as well as FIG. 6, the inner harness 34 is selectively coupled to the outer harness 42, which is disposed proximate to the rear door 90 (FIG. 1). The outer harness 42 includes the first outer support strap 46 and the second outer support strap 48 arranged in a crossing or "X" configuration. Each end 158, 160 of the first outer support strap 46 and each end 162, 164 of the second outer support strap 48 includes the coupling feature 122, such as a hook or clasps, for selectively engaging the base fasteners 104, 106 and the frame fasteners 110, 112, respectively. The first outer support strap 46 extends from the base fastener 106 on the second side edge 30 of the base 14 to the frame fastener 110 of the first support frame 16. The second outer support strap 48 extends between the base fastener 104 on the first side edge 22 and the frame fastener 112 on the second support frame 24. Each of the inner harness 34 and outer harness 42 to selectively engage the same frame fasteners 110, 112.

The crossing or "X" configuration of the outer harness 42 provides additional support created by the strength of the first and second outer support straps 46, 48. Generally, a central portion 172 of the first outer support strap 46 is coupled to a central portion 174 of the second outer support strap 48 at an attachment point 176 via stitching or other coupling methods.

Similar to the inner harness 34, the outer harness 42 includes reinforcing straps 180, 182, 184, 186 arranged around the attachment point 176 to create and reinforce the webbing support provided by the outer harness 42. The reinforcing strap 180 is arranged parallel to the reinforcing strap 182, with each reinforcing strap 180, 182 extending horizontally between the first and second outer support straps 46, 48. The reinforcing strap 180 extends above the attachment point 176 and the reinforcing strap 182 extends below the attachment point 176. The reinforcing strap 184 is generally parallel to the reinforcing strap 186, which each extends vertically between the first and second outer support straps 46, 48. The reinforcing strap 184 is arranged on a first side of the attachment point 176 (e.g., a left side) and the reinforcing strap 186 is arranged on a second opposing side (e.g., a right side) of the attachment point 176. In the illustrated configuration, the reinforcing straps 180, 182, 184, 186 generally form a square or other quadrilateral around the attachment point 176 to increase the strength of the outer harness 42. Each of the reinforcing straps 180, 182, 184, 186 are stitched or otherwise coupled to the first and second outer support straps 46, 48.

Referring still to FIGS. 5 and 6, the inner harness 34 includes inner connector straps 190, 192 and the outer harness 42 includes outer connector straps 194, 196. The inner connector straps 190, 192 generally extend from at least one of the first and second inner support straps 38, 40 and the reinforcing strap 180. The inner connector straps 190, 192 extend in a vehicle-rearward direction toward the outer harness 42. The outer connector straps 194, 196 generally extend from at least one of the reinforcing strap 180 and the first and second outer support straps 46, 48 toward the inner connector straps 190, 192. The first inner connector strap 190 selectively couples with the first outer connector strap 194, and the second inner connector strap 192 selectively couples with the second outer connector strap 196. The coupled inner connector strap 190 and the outer connector strap 194 extends in a generally parallel arrangement with the coupled inner connector strap 192 and the outer connector strap 196.

Each of the inner connector straps 190, 192 includes a first connector portion 198 that selectively engages a mating second connector portion 200 of the respective outer connector strap 194, 196. The first and second connector portions 198, 200 may each be configured as a portion of a buckle or other mating connector assemblies.

Each of the inner harness 34 and outer harness 42 may include at least one tension adjuster 154 to adjust a length of at least one strap, and consequently adjust a tension of the harness assembly 32 around cargo within the cargo space 64. The tension adjusters 154 may be utilized to lessen tension on the cargo when loading or unloading the cargo, as well as for adjusting for larger cargo loads. Additionally or alternatively, once the cargo is loaded in the cargo space 64, the tension may be increased to secure the cargo in the cargo space 64.

Figure 7:
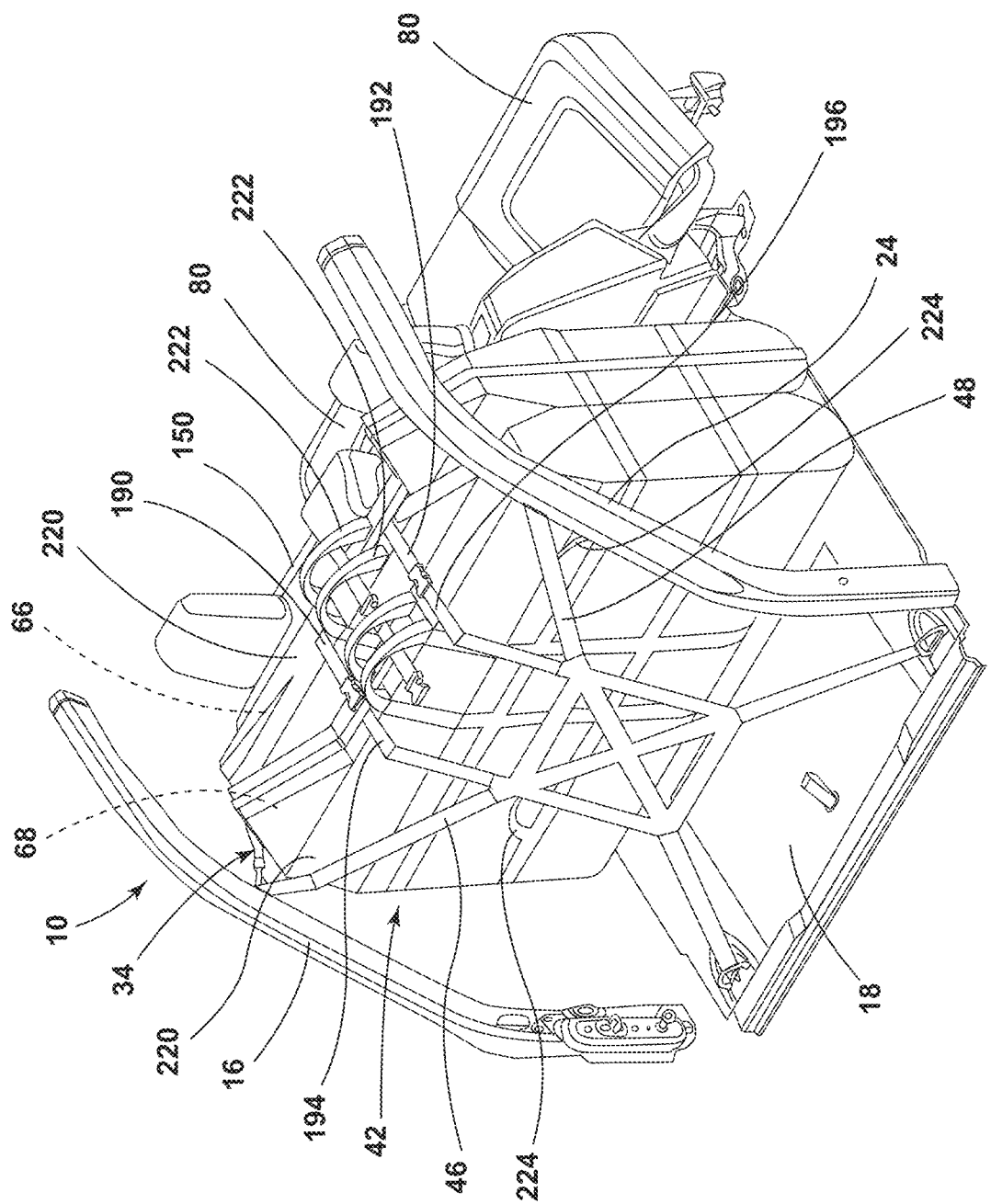
FIG. 7 is a top perspective view of a storage assembly retaining panels within storage features within a vehicle cargo space, according to the present disclosure.
Figure 8:
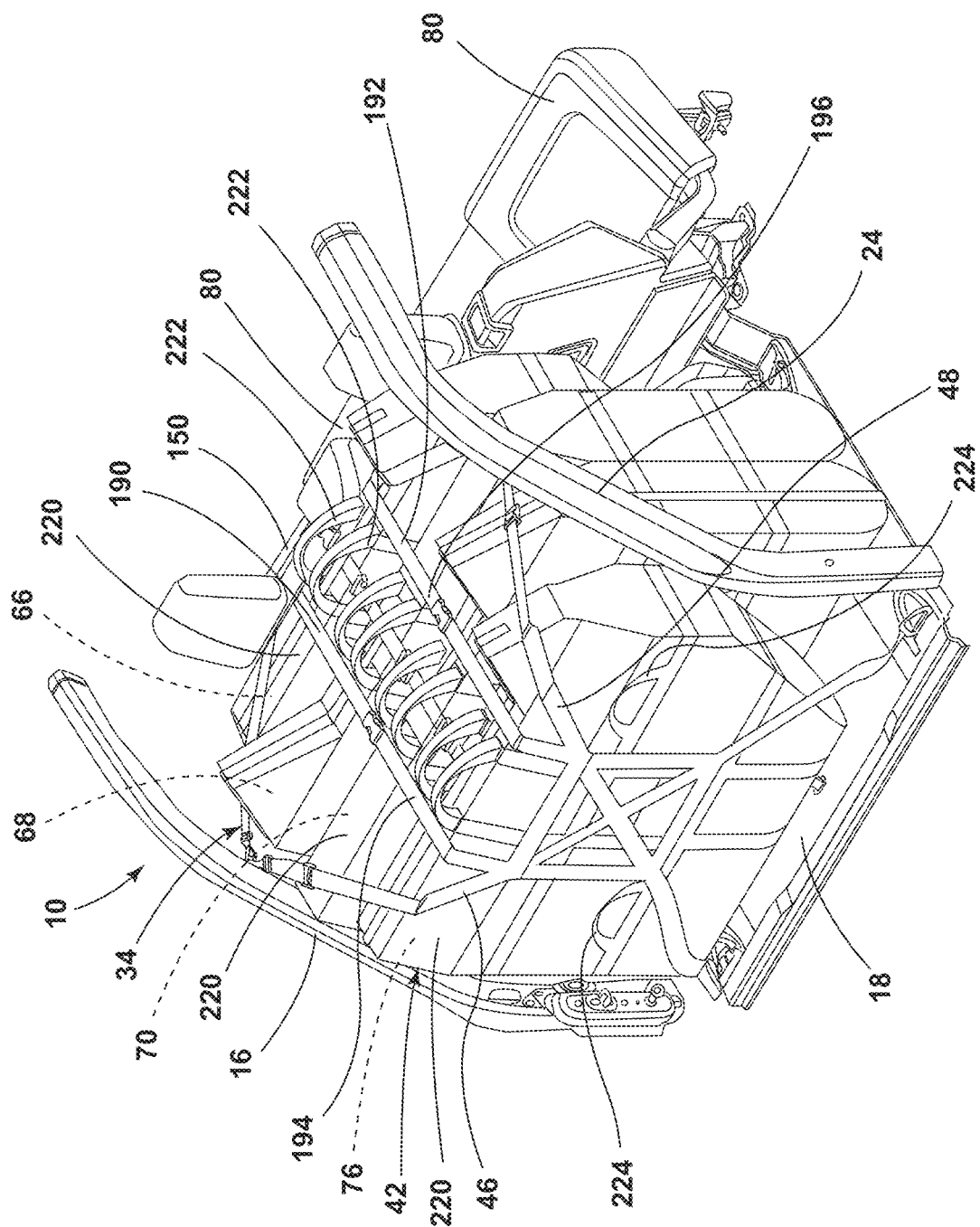
FIG. 8 is a top perspective view of a storage assembly retaining panels within storage features within a vehicle cargo space, according to the present disclosure.

Referring to FIGS. 7 and 8, each panel 60 may be selectively disposed within a corresponding storage feature 220A-220D, which are collectively referred to herein as the storage features 220. The storage features 220 are each illustrated as a bag but may be other storage members without departing from the teachings herein. Each storage feature 220 is uniquely shaped or formed to store a specific panel 60. Each storage feature 220 includes a first pair of handles 222 at a top of the storage feature 220 and a second pair of handles 224 on a side of the storage feature 220 for more ergonomic grip on the storage feature 220. The storage features 220 generally protect the panels 60 while the panels 60 are removed from the vehicle body 62.

The panels 60 are generally placed into the corresponding storage features 220 and enclosed therein. The storage features 220 with the panels 60 are then placed within the cargo space 64 on the base 14 and retained by the harness assembly 32. The harness assembly 32 may be utilized with any combination of number and type of panels 60 from the vehicle 12. For example, as illustrated in FIG. 7, two door panels 60 may be stored within the cargo space 64. The harness assembly 32 may securely retain the door panel 60 in an upright position, abutting the seating assemblies 80. As illustrated in FIG. 8, multiple door panels 60 and at least one roof panel 74 may be stored within the cargo space 64 and secured by the harness assembly 32. The harness assembly 32 may be adjusted to provide a greater space for a greater number of panels 60 while securing the panel 60 in an upright position. When fewer panels 60 are stored within the cargo space 64, the panels 60 may be arranged in a vehicle-forward portion of the cargo space 64 abutting the seating assemblies 80 and secured in the upright position by the harness assembly 32. It is contemplated that the inner harness 34 and/or the outer harness 42 may each be fixedly or removably coupled to the storage features 220 without departing from the teachings herein. In such examples, the storage feature 220A may include or be coupled with the inner harness 32 and the storage feature 220D, or any outermost storage feature 220, may include or be coupled with the outer harness 42.

Figure 9:
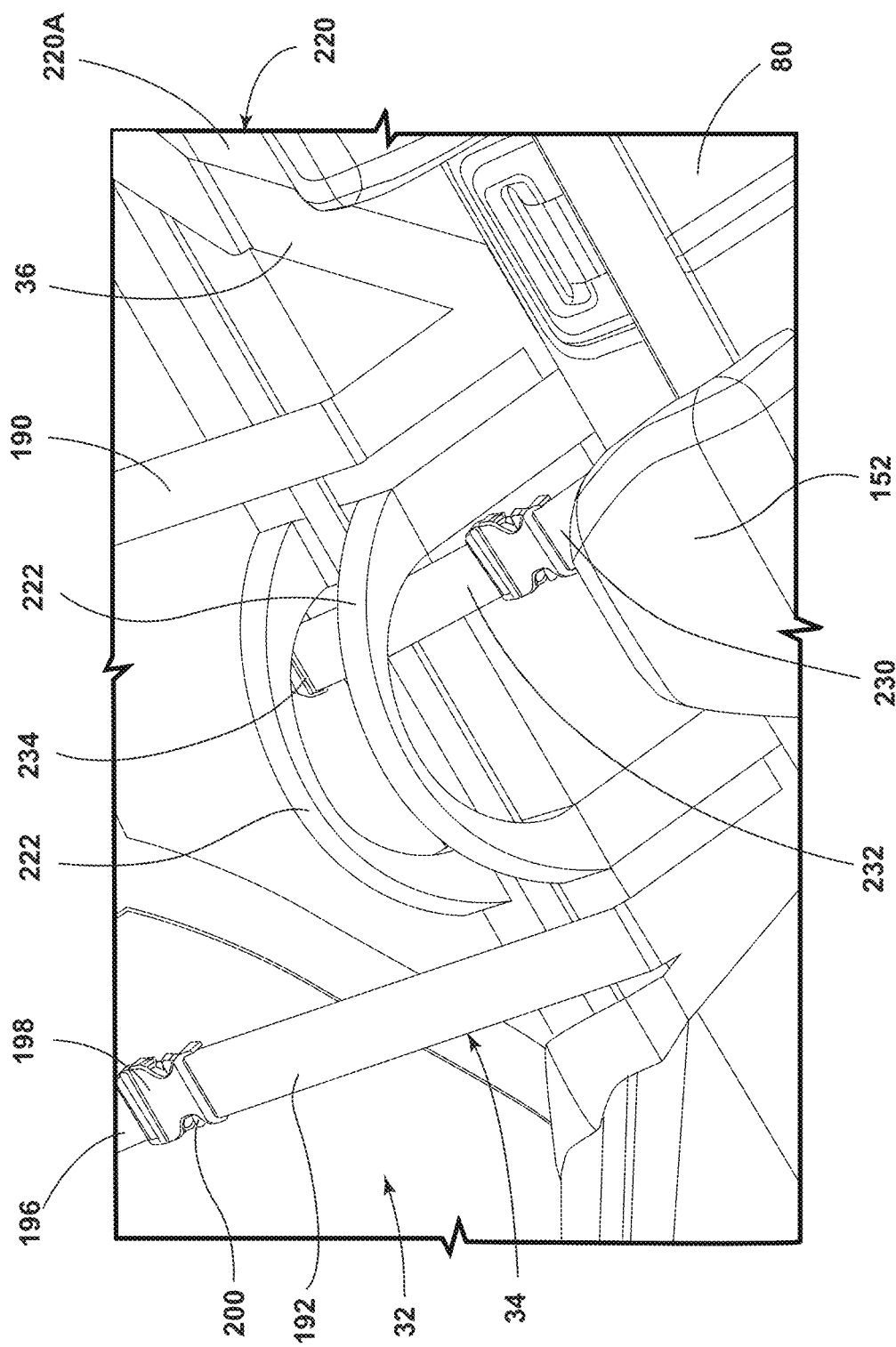
FIG. 9 is a partial top perspective view of a selective coupling between an inner harness and a storage feature in a vehicle cargo space, according to the present disclosure.
Figure 10:
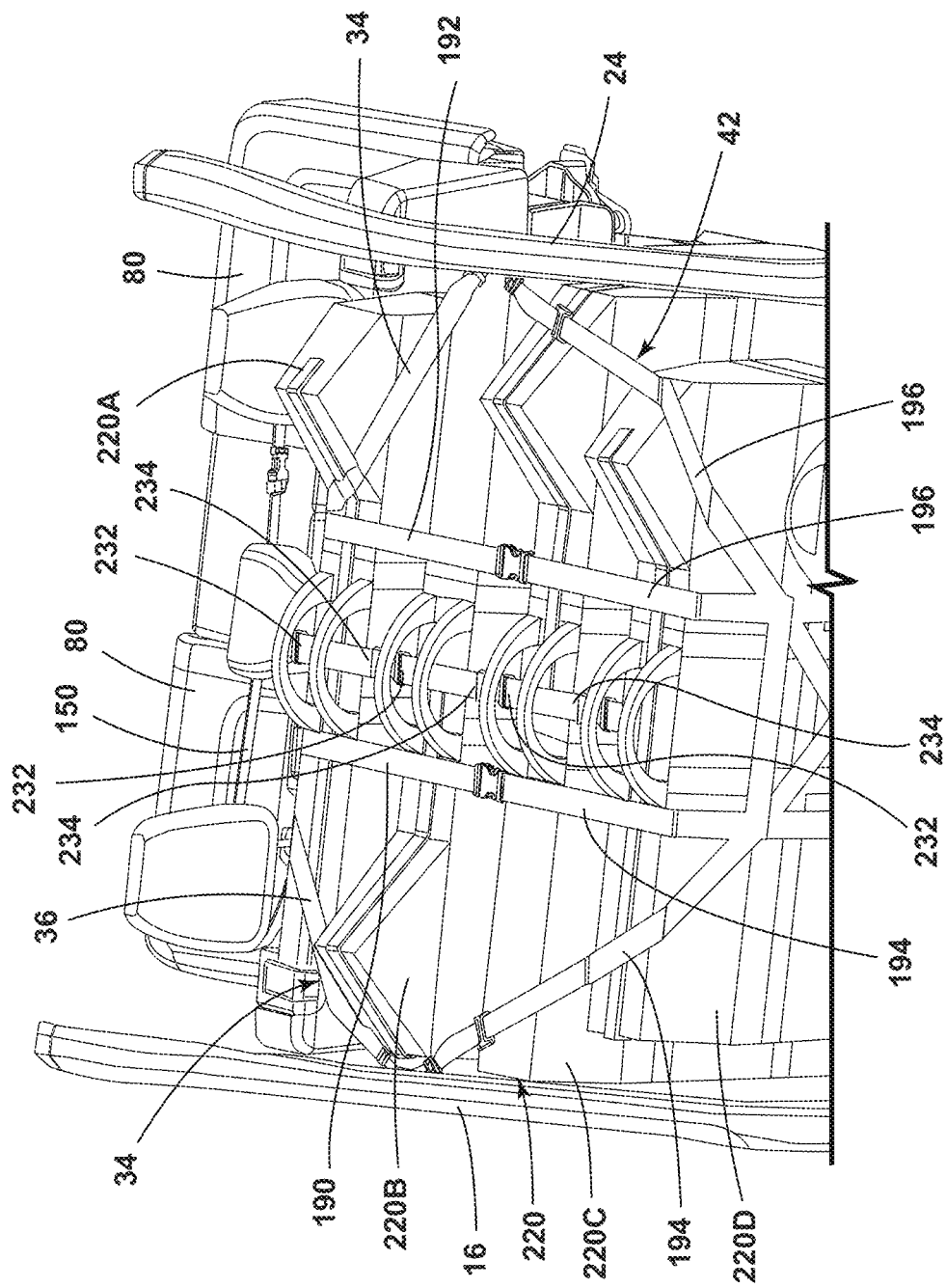
FIG. 10 is a partial top perspective view of connected storage features retained by a storage assembly within a vehicle cargo space.

Referring to FIGS. 9 and 10, the inner harness 34 includes a storage connector portion 230 that extends from the reinforcing strap 134. In the illustrated example, the storage connector portion 230 is arranged to one side of the headrest 152 of the central seating assembly 80, such that the storage connector portion 230 is arranged in an off-center position. It is contemplated that the storage connector portion 230 may be arranged in a center position (e.g., aligned with a center of the middle headrest 152) without departing from the teachings herein.

Each storage feature 220 includes a forward connector portion 232 and a rearward connector 234. The forward connector portion 232 generally extends in a vehicle-forward direction when the storage feature 220 is positioned within the cargo space 64. The rearward connector portion 234 generally extends in a vehicle-rearward direction when the storage feature 220 is positioned within the cargo space 64.

When the first storage feature 220A is loaded into the cargo space 64, the forward connector portion 232 selectively engages the storage connector portion 230 of the inner harness 34. For the subsequent storage features 220B-220D, the forward connector portion 232 of one storage feature 220 generally selectively engages the rearward connector portion 234 of the adjacent storage feature 220. The engagement between the storage connector portion 230 and the forward connector portion 232 of the first storage feature 220A retains the storage feature 220A, and consequently the panel 60 within the storage feature 220A, in the upright position against the seating assemblies 80. This engagement allows the user to obtain a second panel 60 without the first panel 60 moving. When the second panel 60 is positioned within the cargo space 64, the rearward connector portion 234 of the first storage feature 220A and the subsequent storage feature 220B engages the forward connector portion 232 on the subsequent storage feature 220B. Each subsequent storage feature 220 may be selectively secured to the previous storage feature 220. In this way, the harness assembly 32 creates an engagement that retains the storage features 220 in the upright position, as well as uses the inner harness 34 and the outer harness 42 to retain the panel 60 in position within the cargo space 64.

Figure 11:
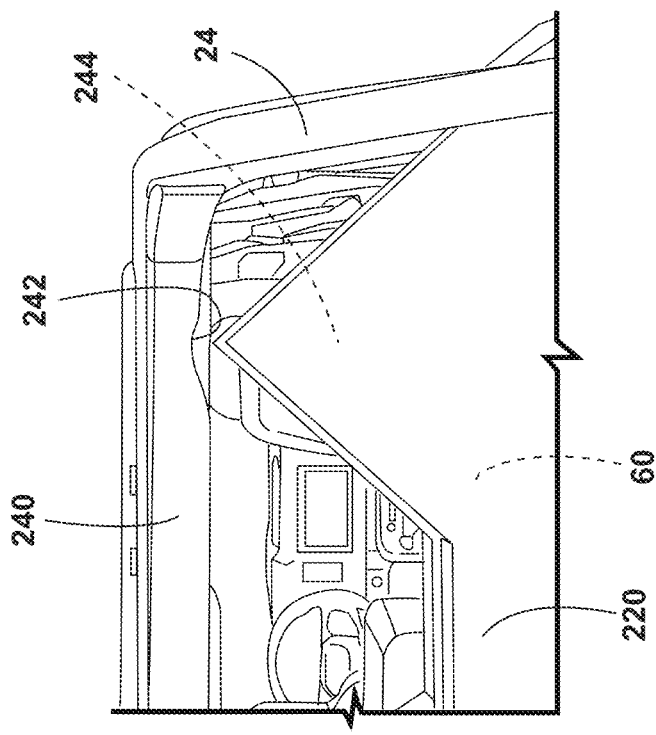
FIG. 11 is a partial rear elevational view of a storage feature housing a panel within a projection, according to the present disclosure.

Referring to FIG. 11, the vehicle 12 may include a trim panel 240 disposed above at least a portion of the cargo space 64. The trim panel 240 may define at least one recess 242 for accommodating the panels 60 within the cargo space 64. Generally, at least one of the door panels 60 has a projection 244 based on the configuration of the corresponding door 66, 68, 70, 72. When positioned in the cargo space 64, the projection 244 extends toward the trim panel 240. The recess 242 in the trim panel 240 provides a space to accommodate the projections 244. Accordingly, the panels 60 may be spaced from the trim panel 240 when positioned within the cargo space 64. It is contemplated that the trim panel 240 may define a single recess 242 to accommodate each projection 244, or alternatively multiple recesses 242 with each recess 242 corresponding to an individual projection 244.

In the illustrated configuration, the recess 242 is disposed on a vehicle-right side of the trim panel 240. The panels 60 may be stored in the cargo space 64 in a particular position to align the projections 244 with the recess 242. As previously mentioned, the storage connector portion 230 of the inner harness 34 is arranged in an off-center position and selectively engages the forward connector portion 232 of the adjacent storage feature 220. The off-center arrangement of the storage connector portion 230 ensures that the storage feature 220 may be positioned in the selected position which aligns with the storage connector portion 230 with the forward connector portion 232 and the projection 244 with the recess 242. If the panels 60 are positioned in a different configuration, the storage connector portion 230 may not align with or engage the forward connector portion 232.

Figure 12:
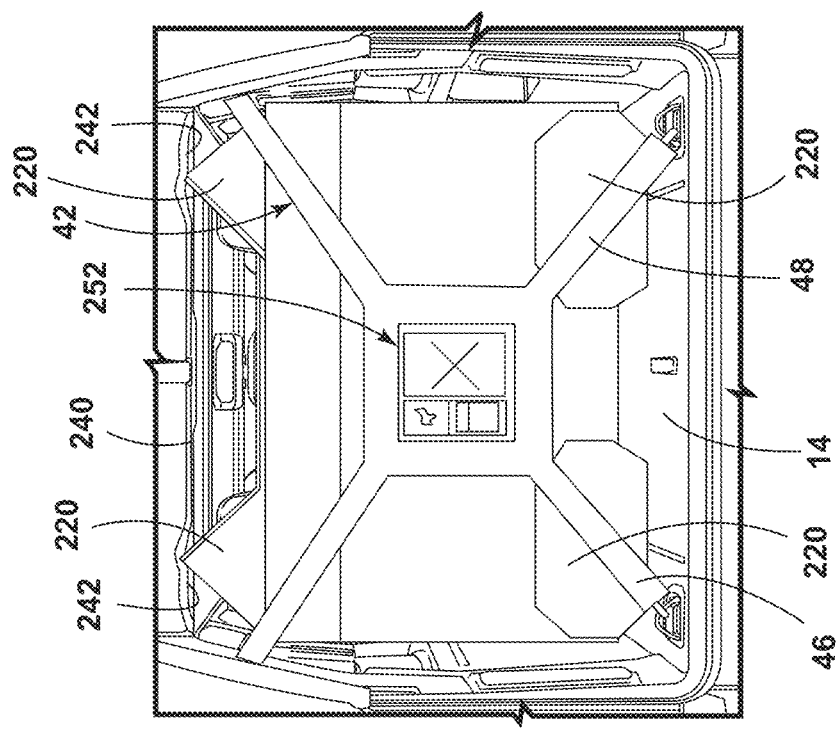
FIG. 12 is a partial rear perspective view of a storage system retaining panels within a vehicle cargo space, according to the present disclosure.

Referring to FIG. 12, as previously stated, the harness assembly 32 may retain less than all the panels 60 associated with the vehicle 12 in the cargo space 64. Additional storage features 220 may be folded and secured within the cargo space 64 by the harness assembly 32. The additional storage features 220 in the folded and placed between the storage features 220 storing the panel 60 and the outer harness 42, thereby securing the additional storage features 220.

Figure 13:
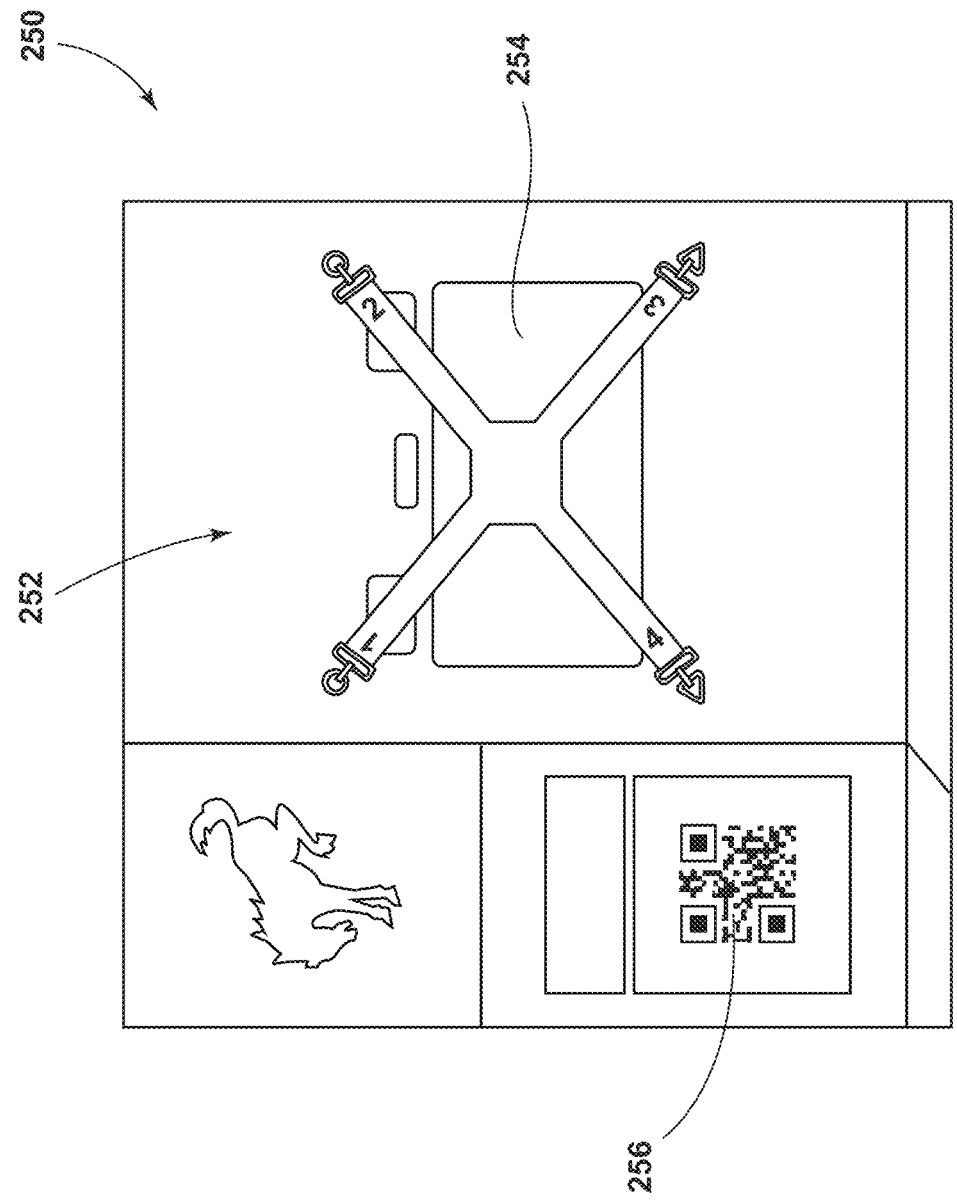
FIG. 13 is representative of a harness label of a vehicle storage assembly, according to the present disclosure.
Figure 14:
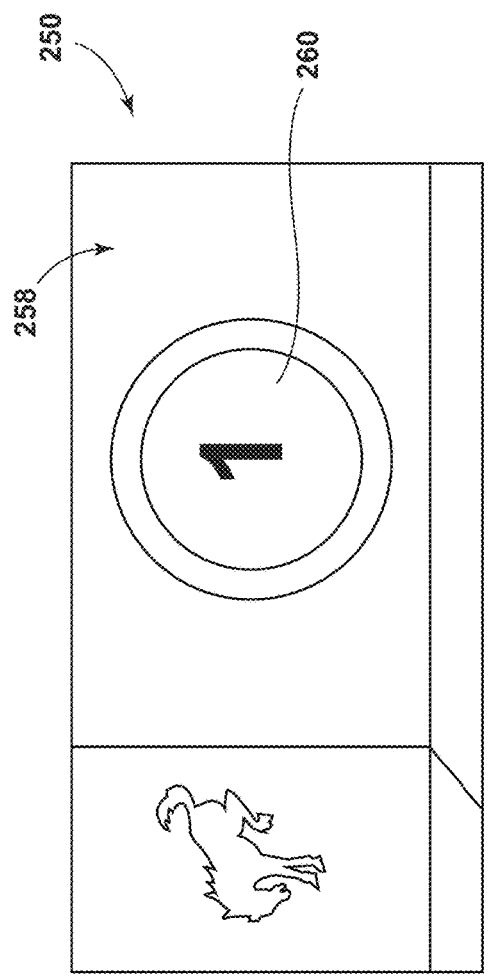
FIG. 14 is representative of a strap end label of a vehicle storage assembly, according to the present disclosure.
Figure 15:
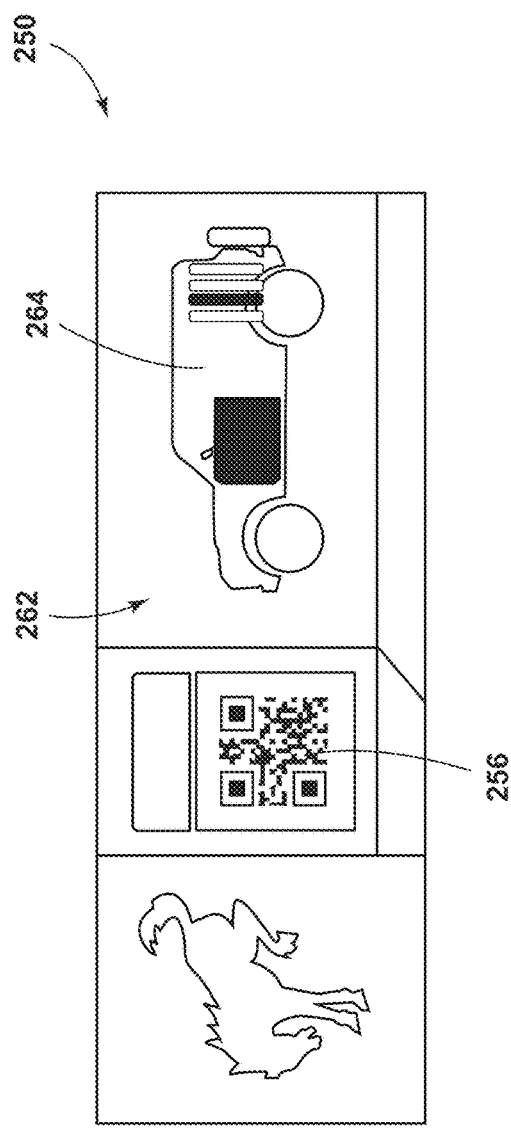
FIG. 15 is representative of a storage label of a vehicle storage assembly, according to the present disclosure.

Referring to FIGS. 13-15, the harness assembly 32 may include multiple instruction labels 250 for assisting in installation of the harness assembly 32 and positioning the panels 60 within the cargo space 64. For example, the instruction labels 250 may include a harness label 252 for each of the inner harness 34 and the outer harness 42. As illustrated in FIG. 13, the harness label 252 for the inner harness 34 is illustrated. The harness label 252 may be coupled over the attachment point 130 of the inner harness 34 and be configured to be displayed in the vehicle-rearward direction when the inner harness 34 is installed. The harness label 252 includes a graphic 254 relating to installation of the inner harness 34. The graphic 254 generally illustrates the position of each end 114, 116, 118, 120 within the cargo space 64. The harness label 252 may also include a scannable code 256, such as a quick response (QR) code, which can be scanned with a user device to display additional instructions or instructional videos on the user device. The harness label 252 associated with the outer harness 42 may be arranged similarly and have similar information as the harness label 252 associated within the inner harness 34.

The graphic 254 labels each end 114, 116, 118, 120 with a number that corresponds with a strap end label 258. Each end 114, 116, 118, 120 of the inner harness 34 and each end 158, 160, 162, 164 of the outer harness 42 includes the strap end label 258. In the illustrated example of FIG. 14, the strap end label 258 associated with the end 114 of the inner harness 34 is illustrated, though each strap end label 258 may be similarly configured. The strap end label 258 includes a number identifier 260. The number identifier 260 corresponds with the graphic 254 on the harness label 252. Accordingly, when the harness label 252 illustrated strap number one as an upper left end, the user can view the number identifier 260 on the inner harness 34 and orient the inner harness 34 to match the graphic 254 on the harness label 252. Utilizing both the harness labels 252 and the strap end labels 258, the user can identify and position the inner and outer harnesses 34, 42 in the selected position, which is advantageous for providing optimized support for the panels 60.

Referring again to FIG. 15, each storage feature 220 may include a storage label 262. Each storage label 262 may include a graphic 264 that indicates which panel 60 is to be stored within the respective storage feature 220. Additionally, the graphic 264 indicates which position the panel 60 is stored within the cargo space 64. Generally, the panels 60 may have an ideal configuration based on the configuration of the vehicle body 62 and the cargo space 64. The graphic 264 in the illustrated example shows that the rear driver door 68 is stored within the storage feature 220 and that the front driver door 66 is the second panel 60 stored within the cargo space 64. The panels 60 may be stored within the cargo space 64 in a predefined order, which is generally indicated by the instruction labels 250 or otherwise conveyed to the user. The storage labels 262 may also include the scannable code 256 for access to additional instructions or instructional videos.

Figure 16:
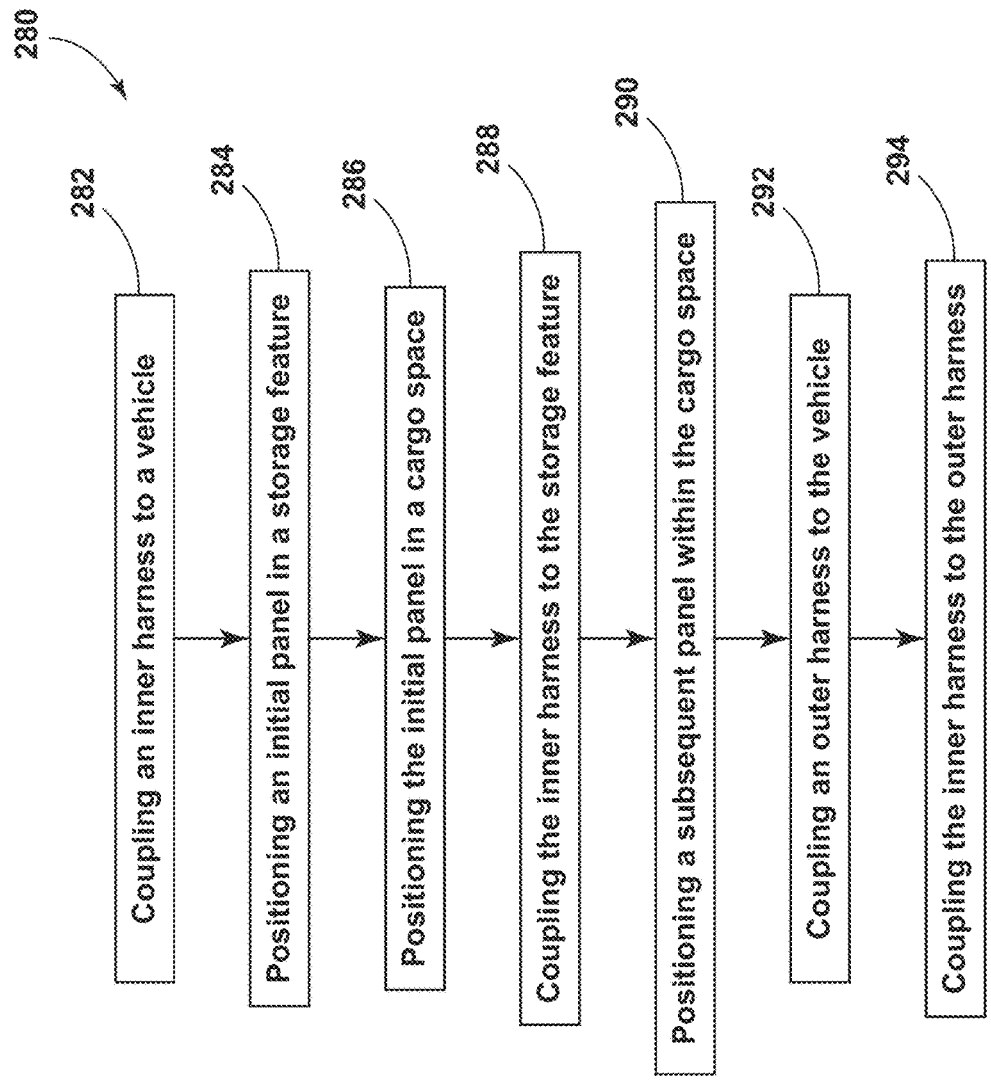
FIG. 16 is a flow diagram of a method for storing panels in a vehicle cargo space.

Referring to FIG. 16, as well FIGS. 1-15, a method 280 of storing the panels 60 within the cargo space 64 of the vehicle 12 includes step 282 where the inner harness 34 is selectively coupled with the vehicle 12. The lower ends 116, 120 of the first and second inner support straps 38, 40 are coupled to the base fasteners 100, 102. The upper ends 114, 118 of the first and second support straps 38, 40 are coupled to the frame fasteners 110, 112. The stabilizing strap 150 is looped around the headrests 152 of the seating assemblies 80 in the second seating row 84. The inner harness 34 is adjusted via the tension adjusters 154 to pull the inner harness 34 into a taught configuration. The inner harness 34 may be arranged such that the harness label 252 is illustrated from proximate to the rear door 90.

In step 284, the panel 60 to be placed in the cargo space 64 is selectively positioned within the corresponding storage feature 220A. The storage features 220A for the door panel 60 may be substantially positioned around the door panel 60 when the doors are still connected to the vehicle body 62. Alternatively, the panel 60 may be removed from the vehicle body 62 and subsequently placed in the storage feature 220. In step 286, the panel 60 within the storage feature 220A is positioned within the cargo space 64. The user may use the first handles 222 and/or the second handles 224 to assist in carrying the panel 60. In step 286, the storage feature 220A with the storage label 262 indicating it is the first bag may be stored within the cargo space 64. The panel 60 may be arranged such that the storage label 262 is viewable from proximate to the rear door 90.

In step 288, the forward connector portion 232 of the storage feature 220A is connected to the storage connector portion 230 of the inner harness 34. This engagement retains the panel 60 in an upright position without the user continuing to hold the panel 60. In step 290, a subsequent panel 60 may be retrieved by the user, positioned within the corresponding storage feature 220B, and positioned within the cargo space 64. The rearward connector portion 234 of the first storage feature 220A is selectively coupled with the forward connector portion 232 of the subsequent storage feature 220B. Any additional panels 60 may be retrieved, positioned in the corresponding storage feature 220, loaded into the cargo space 64, and connected to the previous storage feature 220.

In step 292, the outer harness 42 may be coupled to the vehicle 12. The lower ends 160, 164 of the first and second outer support straps 46, 48 are coupled to the base fasteners 104, 106. Upper ends 158, 162 of the first and second outer support straps 46, 48 are coupled to the frame fasteners 110, 112. The outer harness 42 is adjusted via the tension adjusters 154 to be formed fit around the panel 60 within the cargo space 64. Additionally, in step 294, the outer harness 42 is coupled with the inner harness 34 via the inner connector straps 190, 192 and the outer connector straps 194, 196. If there are any unused storage features 220, the storage features 220 may be folded and stored between the panels 60 and the outer harness 42. In step 294, the inner and outer harnesses 34, 42 may then be brought into a taught configuration with the tension adjusters 154 to secure Use of the present device may provide for a variety of advantages. For example, the harness assembly 32 may retain the panel 60 within the position in the cargo space 64 during operation of the vehicle 12. Further, the storage assembly 10 may provide a process for storing the panels 60 to be carried with the vehicle 12. Additionally, the storage features 220 may be unique to each panel 60. Moreover, the storage features 220 may protect the panel 60 during transportation in the vehicle 12 and by the user. Also, the storage features 220 may be utilized to store the panels 60 outside of the vehicle 12. Further, the harness assembly 32 may include connections between the storage features 220 of various panel 60, as well as between the storage feature 220 and the stabilizing strap 150 of the inner harness 34. The various connections between storage features 220 and the stabilizing strap 150 retain the panel 60 in an upright position. Further, the harness assembly 32 includes instruction labels 250 that provide convenient and efficient installation instructions to the user. Additional benefits and or advantages may be realized and/or achieved.

According to various examples, a vehicle storage assembly includes a base. A first support frame has a first end and a second end. The first end of the first support frame is disposed proximate to a first side edge of the base. A second support frame has a first end and a second end. The first end of the second support frame is disposed proximate to a second side edge of the base. The first side edge opposes the second side edge. A harness assembly is coupled to the base, the first support frame, and a second support frame. The harness assembly includes an inner harness coupled to an inner side of the base. The inner harness includes a first inner strap that extends from the second side edge to the first support frame and a second inner strap that extends from the first side edge to the second support frame. An outer harness is coupled to an outer side of the base. The outer harness includes a first outer strap that extends from the second side edge to the first support frame and a second outer strap that extends from the first side edge to the second support frame. Embodiments of the present disclosure may include one or a combination of the following features:

- the first inner strap and the first outer strap selectively couple to a fastener coupled to the first support frame;
- the inner harness includes a stabilizing strap that selectively couples with a seating assembly disposed proximate to the base;
- a vehicle panel selectively disposed within a storage feature, wherein the storage feature includes a connector portion that selectively engages a mating connector portion of the inner harness;
- the first outer strap and the second outer strap are arranged in a crossing configuration, wherein a central portion of the first outer strap is coupled to a central portion of the second outer strap at an attachment point;
- reinforcing straps coupled to the first outer strap and the second outer strap, wherein the reinforcing straps are arranged around the attachment point between the first outer strap and the second outer strap; and
- the inner harness includes an inner connector strap that selectively engages with an outer connector strap of the outer harness.

According to various examples, a storage assembly for a vehicle cargo space includes a base. A first support frame has a first end and a second end. The first end of the first support frame is disposed proximate to a first side edge of the base. A second support frame has a first end and a second end. The first end of the second support frame is disposed proximate to a second side edge of the base. The first side edge opposes the second side edge. A harness assembly is coupled to the base, the first support frame, and a second support frame. The harness assembly includes an inner harness coupled to an inner side of the base. The inner harness includes at least one inner support strap and at least one inner connector strap. An outer harness is coupled to an outer side of the base. The outer harness includes at least one outer support strap and at least one outer connector strap. Embodiments of the present disclosure may include one or a combination of the following features:

- the at least one inner support strap includes a first inner support strap coupled to a second inner support strap in a crossing configuration;
- the at least one outer support strap includes a first outer support strap coupled to a second outer support strap in a crossing configuration;
- the at least one inner connector strap includes a first inner connector strap and a second inner connector strap and the at least one outer connector strap includes a first outer connector strap and a second outer connector strap;
- a vehicle panel selectively disposed within a storage feature, wherein the first inner connector strap selectively engages the first outer connector strap over the storage feature, and wherein the second inner connector strap selectively engages the second outer connector strap over the storage feature;
- a first vehicle panel selectively disposed within a first storage feature, wherein the first storage feature includes a first storage connector portion and a second storage connector portion; and a second vehicle panel selectively disposed within a second storage feature, wherein the second storage feature includes a first storage connector portion and second storage connector portion, wherein the first storage connector portion of the second storage feature selectively engages with the second storage connector portion of the first storage feature;
- the inner harness includes a mating connector portion that selectively engages the first storage connector portion of the first storage feature; and
- each of the inner harness and the outer harness selectively engages a first fastener coupled to the first support frame and a second fastener coupled to the second support frame.

According to various examples, a storage assembly for a vehicle includes a first harness assembly configured to selectively engage said vehicle. The first harness assembly includes a first inner support strap and a second inner support strap coupled to the first inner support strap. The first inner support strap and the second inner support strap are arranged in a crossing configuration. An inner connector strap is coupled to at least one of the first inner support strap and the second inner support strap. A second harness assembly is configured to selectively engage said vehicle. The second harness assembly includes a first outer support strap and a second outer support strap coupled to the first outer support strap. The first outer support strap and the second outer support strap are arranged in a crossing configuration. An outer connector strap is coupled to at least one of the first outer support strap and the second outer support strap. The outer connector strap of the first harness assembly selectively couples with the inner connector strap of the second harness assembly. Embodiments of the present disclosure may include one or a combination of the following features:

the first harness assembly includes a stabilizing strap configured to selectively engage a seating assembly of said vehicle;

the first outer support strap and the second outer support strap are coupled at a central attachment point, wherein the second harness assembly includes a reinforcing strap that extends between the first outer support strap and the second outer support strap proximate to the central attachment point;

the first harness assembly includes a connector portion configured to selectively engage with a mating connector portion of a storage feature for housing a vehicle panel; and a base, wherein the first harness assembly is selectively coupled to a first side of the base and the second harness assembly is selectively coupled to a second opposing side of the base.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle storage assembly, comprising:
    a base;
    a first support frame having a first end and a second end, wherein the first end of the first support frame is disposed proximate to a first side edge of the base;
    a second support frame having a first end and a second end, wherein the first end of the second support frame is disposed proximate to a second side edge of the base, wherein the first side edge opposes the second side edge; and
    a harness assembly coupled to the base, the first support frame, and the second support frame, wherein the harness assembly includes:
        an inner harness coupled to an inner side of the base, wherein the inner harness includes a first inner strap that extends from the second side edge to the first support frame and a second inner strap that extends from the first side edge to the second support frame; and
        an outer harness coupled to an outer side of the base, wherein the outer harness includes a first outer strap that extends from the second side edge to the first support frame and a second outer strap that extends from the first side edge to the second support frame.

2. The vehicle storage assembly of claim 1, wherein the first inner strap and the first outer strap selectively couple to a fastener coupled to the first support frame.

3. The vehicle storage assembly of claim 1, wherein the inner harness includes a stabilizing strap that selectively couples with a seating assembly disposed proximate to the base.

4. The vehicle storage assembly of claim 1, further comprising:
    a vehicle panel selectively disposed within a storage feature, wherein the storage feature includes a connector portion that selectively engages a mating connector portion of the inner harness.

5. The vehicle storage assembly of claim 1, wherein the first outer strap and the second outer strap are arranged in a crossing configuration, and wherein a central portion of the first outer strap is coupled to a central portion of the second outer strap at an attachment point.

6. The vehicle storage assembly of claim 5, further comprising:
    reinforcing straps coupled to the first outer strap and the second outer strap, wherein the reinforcing straps are arranged around the attachment point between the first outer strap and the second outer strap.

7. The vehicle storage assembly of claim 1, wherein the inner harness includes an inner connector strap that selectively engages with an outer connector strap of the outer harness.

8. A storage assembly for a vehicle cargo space, comprising:
    a base;
    a first support frame having a first end and a second end, wherein the first end of the first support frame is disposed proximate to a first side edge of the base;
    a second support frame having a first end and a second end, wherein the first end of the second support frame is disposed proximate to a second side edge of the base, wherein the first side edge opposes the second side edge; and a harness assembly coupled to the base, the first support frame, and a second support frame, wherein the harness assembly includes:

an inner harness coupled to an inner side of the base, wherein the inner harness includes at least one inner support strap and at least one inner connector strap; and an outer harness coupled to an outer side of the base, wherein the outer harness includes at least one outer support strap and at least one outer connector strap, wherein the at least one inner connector strap selectively couples with the at least one outer connector strap.

9. The storage assembly of claim 8, wherein the at least one inner support strap includes a first inner support strap coupled to a second inner support strap in a crossing configuration.

10. The storage assembly of claim 8, wherein the at least one outer support strap includes a first outer support strap coupled to a second outer support strap in a crossing configuration.

11. The storage assembly of claim 8, wherein the at least one inner connector strap includes a first inner connector strap and a second inner connector strap and the at least one outer connector strap includes a first outer connector strap and a second outer connector strap.

12. The storage assembly of claim 11, further comprising:

a vehicle panel selectively disposed within a storage feature, wherein the first inner connector strap selectively engages the first outer connector strap over the storage feature, and wherein the second inner connector strap selectively engages the second outer connector strap over the storage feature.

13. The storage assembly of claim 8, further comprising:

a first vehicle panel selectively disposed within a first storage feature, wherein the first storage feature includes a first storage connector portion and a second storage connector portion; and a second vehicle panel selectively disposed within a second storage feature, wherein the second storage feature includes a first storage connector portion and second storage connector portion, wherein the first storage connector portion of the second storage feature selectively engages with the second storage connector portion of the first storage feature.

14. The storage assembly of claim 13, wherein the inner harness includes a mating connector portion that selectively engages the first storage connector portion of the first storage feature.

15. The storage assembly of claim 8, wherein each of the inner harness and the outer harness selectively engages a first fastener coupled to the first support frame and a second fastener coupled to the second support frame.

16. A storage assembly for a vehicle, comprising:

a first harness assembly configured to selectively engage said vehicle, wherein the first harness assembly includes:

a first inner support strap;

a second inner support strap coupled to the first inner support strap, wherein the first inner support strap and the second inner support strap are arranged in a crossing configuration; and an inner connector strap coupled to at least one of the first inner support strap and the second inner support strap; and a second harness assembly configured to selectively engage said vehicle, wherein the second harness assembly includes:

a first outer support strap;

a second outer support strap coupled to the first outer support strap, wherein the first outer support strap and the second outer support strap are arranged in a crossing configuration; and an outer connector strap coupled to at least one of the first outer support strap and the second outer support strap, wherein the outer connector strap of the second harness assembly selectively couples with the inner connector strap of the first harness assembly.

17. The storage assembly of claim 16, wherein the first harness assembly includes a stabilizing strap configured to selectively engage a seating assembly of said vehicle.

18. The storage assembly of claim 16, wherein the first outer support strap and the second outer support strap are coupled at a central attachment point, and wherein the second harness assembly includes a reinforcing strap that extends between the first outer support strap and the second outer support strap proximate to the central attachment point.

19. The storage assembly of claim 16, wherein the first harness assembly includes a connector portion configured to selectively engage with a mating connector portion of a storage feature for housing a vehicle panel.

20. The storage assembly of claim 16, further comprising:

a base, wherein the first harness assembly is selectively coupled to a first side of the base and the second harness assembly is selectively coupled to a second opposing side of the base.

\* \* \* \* \*